United States Patent
Lüchinger et al.

(10) Patent No.: US 6,849,809 B2
(45) Date of Patent: Feb. 1, 2005

(54) BALANCE WITH A WEIGHING COMPARTMENT

(75) Inventors: Paul Lüchinger, Uster (CH); Eduard Fringeli, Bubikon (CH); Beat Meister, Wolfhausen (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/729,717

(22) Filed: Dec. 5, 2003

(65) Prior Publication Data

US 2004/0079559 A1 Apr. 29, 2004

Related U.S. Application Data

(62) Division of application No. 09/957,933, filed on Sep. 21, 2001, now Pat. No. 6,686,545.

(30) Foreign Application Priority Data

Oct. 4, 2000 (CH) ..................................... 2000 1958/00

(51) Int. Cl.⁷ ............................................. G01G 21/28
(52) U.S. Cl. ...................................... 177/180; 177/238
(58) Field of Search .................................. 177/180–182, 177/238–244

(56) References Cited

U.S. PATENT DOCUMENTS

| | | | | |
|---|---|---|---|---|
| 4,664,207 A | * | 5/1987 | Knothe et al. | 177/181 |
| 4,676,327 A | * | 6/1987 | Luechinger | 177/126 |
| 4,700,793 A | * | 10/1987 | Luchinger | 177/181 |
| 4,714,121 A | * | 12/1987 | Kroll et al. | 177/134 |
| 5,152,356 A | * | 10/1992 | Strickler et al. | 177/180 |
| 5,170,855 A | * | 12/1992 | Kunz et al. | 177/181 |
| 6,686,545 B2 | * | 2/2004 | Luchinger et al. | 177/180 |

* cited by examiner

Primary Examiner—Randy W. Gibson
(74) Attorney, Agent, or Firm—Friedrich Kueffner

(57) ABSTRACT

A balance (1) has a weighing compartment (4) that borders on a stationary part (8, 9) of the balance and is otherwise enclosed by at least one side wall panel (5, 6), a front wall panel (7), and a top cover panel (12). At least one of the panels is slidable by means of a guiding device (17, 20) to open and close the weighing compartment (4). The balance (1) further has a handle (13) for lifting the balance (1) off a support surface and/or for carrying the balance (1).

11 Claims, 4 Drawing Sheets

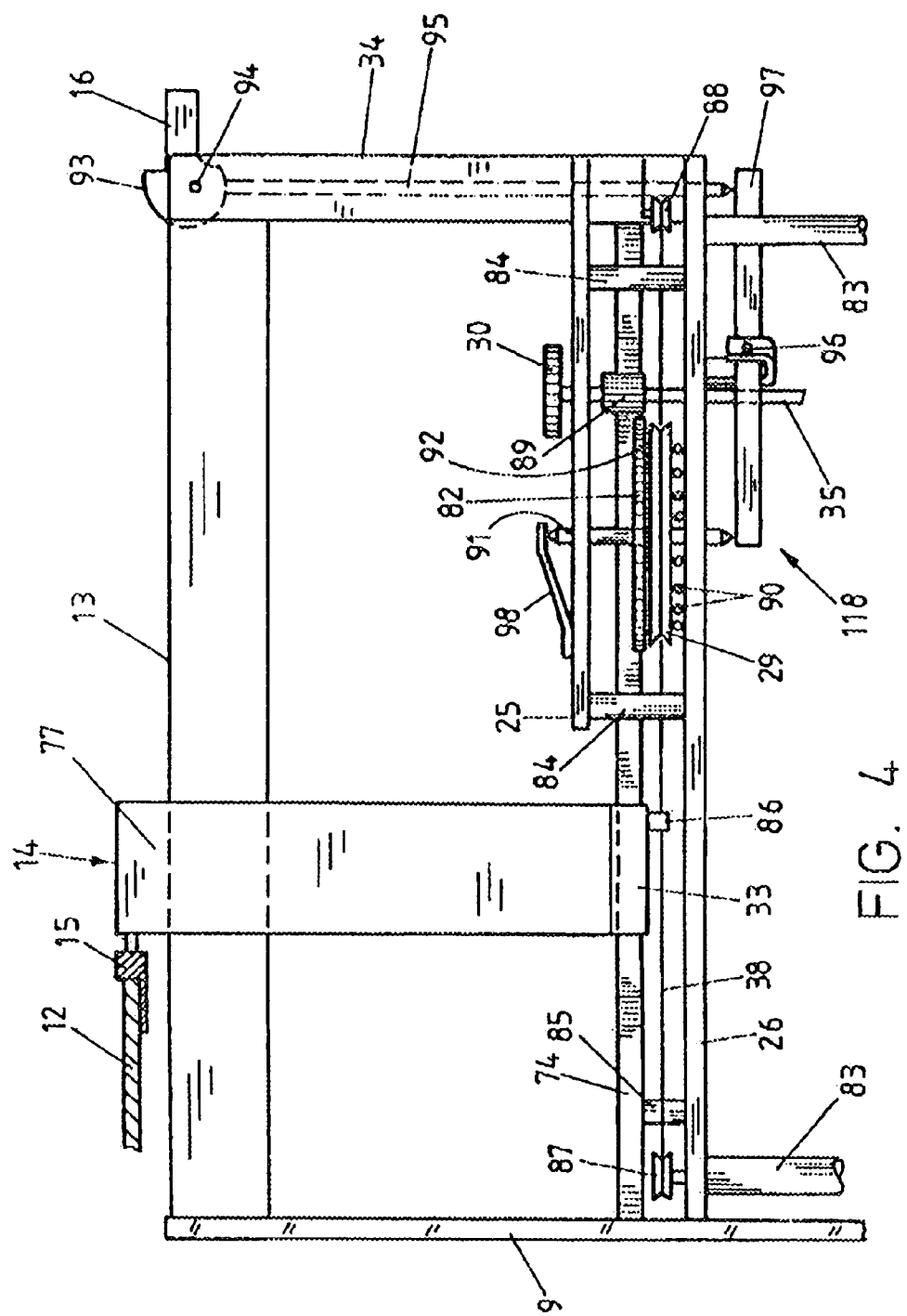

BALANCE WITH A WEIGHING COMPARTMENT

CROSS-REFERENCE TO RELATED APPLICATION

This application is a divisional of U.S. patent application Ser. No. 09/957,933, filed Sep. 21, 2001, now U.S. Pat. No. 6,686,545, issued Feb. 3, 2004.

BACKGROUND OF THE INVENTION

The present invention relates to a balance with a weighing compartment that borders on a stationary part of the balance and is otherwise enclosed by at least one side wall, a front wall, and a top cover panel, where at least one of the walls and/or the top cover panel is slidable by means of a guiding device to open and close the weighing compartment.

A known balance of this kind, as described for example in the European patent application EP-A-0 234 008, has a weighing pan and a weighing compartment that encloses the weighing pan on all sides, with a stationary front glass wall, rearward-sliding side walls, a rearward-sliding top cover panel, and a connector that joins the side walls with the top cover panel. The connector is configured so that when a side wall and/or the top cover panel is opened or closed, the connector moves together with the side wall and/or the top cover panel, so that the weighing compartment is freely accessible without being obstructed by frame members on the sides. Furthermore, the side walls can be opened and closed individually or together, with or without moving the top cover panel at the same time. The movement can be motorized or manual. With manual operation, the walls that are to be moved are uncoupled from the motorized drive mechanism. The European patent application EP-A-0 574 668 discloses a balance that has a draft-protection housing with a top cover panel that can be attached or taken off by means of a manually operated locking arrangement. After the top cover panel has been taken off, the front wall as well as the side walls can be completely removed from the housing for cleaning. In this known design of a balance, the top cover panel is part of a frame that holds the draft-protection housing together. To a certain extent, the walls are unobstructed by the frame members so that the operator has a better view of the interior of the housing, but for some applications, this design is still not entirely satisfactory. One drawback is that the upper part of the frame is still a required element, and another concern is that the locking elements, which have to be manufactured with high precision, require a certain amount of manipulation in order to align them with the recesses in which they are received.

OBJECT OF THE INVENTION

It is therefore the object of the present invention to provide a balance that is easy to handle and easy to clean, without the need for complex manipulations. The objective includes in particular that the work surface on which the balance is set up can be cleaned easily and completely.

SUMMARY OF THE INVENTION

The present invention offers a solution to the afore-described problem in a balance with a weighing compartment that borders in part on a stationary part of the balance and is otherwise enclosed by at least one side wall panel, a front wall panel, and a top cover panel, where at least one of the walls and/or the top cover panel is slidable by means of a guiding device to open and close the weighing compartment. According to the invention, the balance is equipped with a handle that serves to lift the balance from the surface on which it is set up and/or to carry the balance.

A handle of this kind improves the handling of the balance. For example, the handle allows the balance to be lifted up with one hand, while cleaning the table surface underneath the balance with the other hand.

Preferably, the handle is attached to the stationary part of the balance. With particular preference, the handle is attached on the top of the balance, where the preferred arrangement of the handle is near the top cover panel.

In an advantageous embodiment of the invention, the design of the handle as well as its arrangement on the balance allow the balance to be lifted with one hand.

As a special feature of the invention, a guiding device for the movable top-cover panel is integrated at least partially in the handle. The handle serves in particular as a guide rail for a guiding element that guides the sliding movement of the top cover panel.

In an advantageous embodiment, the guiding device has at least one gear rack in an upper area of the guiding device and a parallel gear rack in a lower area. A vertical body of the guide element contains a pair of identical gears fixed on a vertical axle and rolling along the gear racks, whereby the guide element is held in alignment and prevented from jamming as it moves back and forth. This vertical arrangement of the guide element has the advantage that it minimizes the length of the guiding device for the top cover panel.

In a particularly advantageous embodiment of the inventive balance, a holder element for the top cover panel is integrated in the guiding device. The holder element has a form-locking closure device that holds or releases the top cover panel simply through the application of a manual force to the top cover panel and/or to the holder element.

In a further advantageous embodiment of the balance, a clutch is arranged on the handle, whereby the top cover panel can be coupled to and uncoupled from a motorized drive mechanism that serves to move the at least one slidable wall.

BRIEF DESCRIPTION OF THE DRAWINGS

Further details of the invention may be learned from the following description of embodiments that are illustrated in the drawings, wherein

FIG. 4 represents a side view of the drive mechanism of the top cover panel.

DETAILED DESCRIPTION OF PREFERRED EMBODIMENTS

Figure 1:
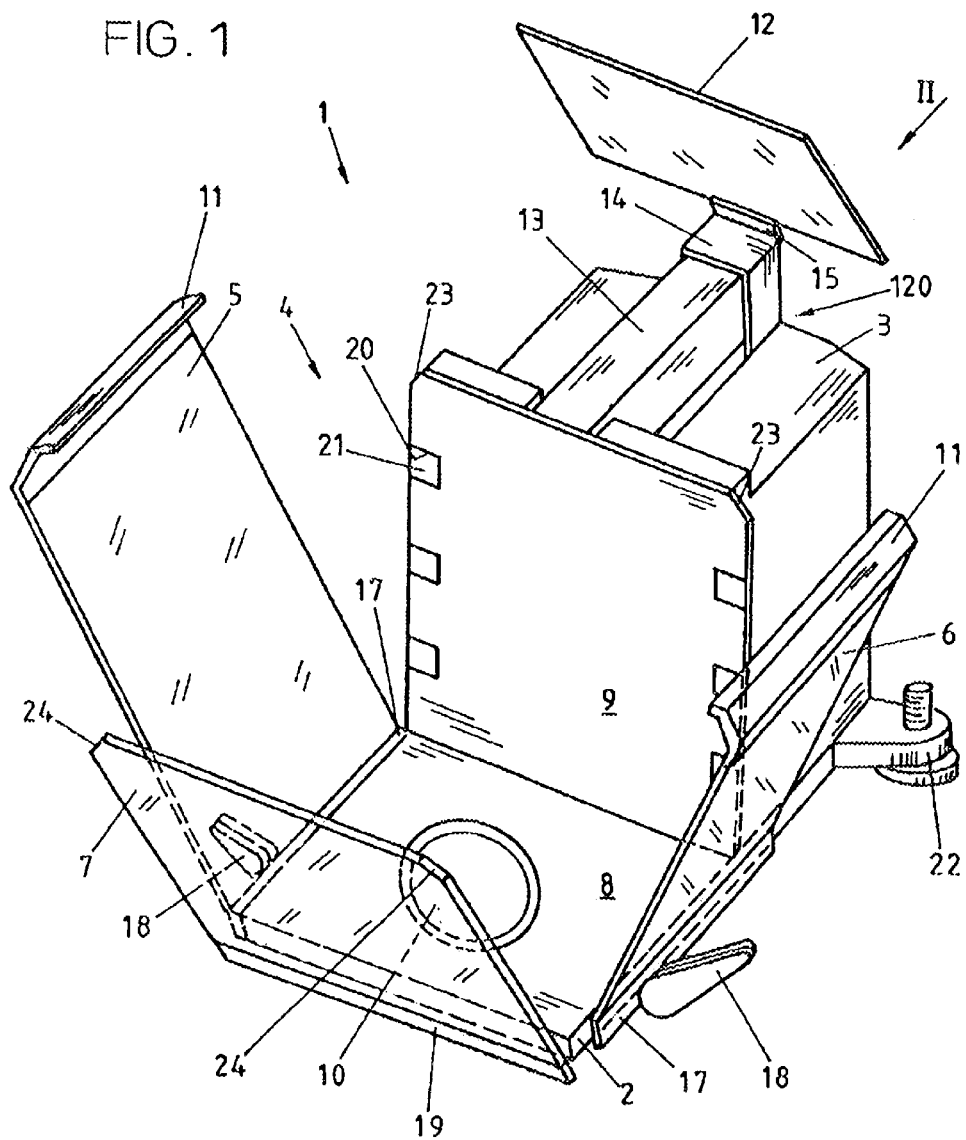
FIG. 1 represents a perspective frontal view of a balance according to the invention.

A balance according to FIG. 1 has a stationary part with a floor compartment 2 that contains a portion of the working system of the balance, a housing 3 that essentially contains the drive mechanism, and a weighing compartment 4. The rear wall 9 and the floor 8 of the weighing compartment 4 are formed by the stationary part. The weighing compartment 4 is further enclosed by the side walls 5, 6, the front wall 7, and the top cover panel 12, which serve as a draft shield. The floor 8 has a pass-through opening for the carrier of the weighing pan 10. However, the weighing pan can also be supported by an L-shaped cantilever arm that is attached to a coupling arrangement that passes through the rear wall of the weighing compartment, as described in EP 1 195 586 A1. The different designs of the weighing pan and/or the features of the weighing compartment described in the reference just mentioned are likewise applicable to the balance described herein.

Preferably, the balance 1 stands on three feet 22.

The side walls 5, 6, the front wall 7, and the top cover panel 12 consist of a transparent material, preferably glass. It is also possible to use tempered glass, especially to make the balance safer for applications in rough environments or to make the walls less delicate to handle, so that they can, e.g., be washed in a machine.

The side walls 5, 6 and the top cover panel 12 are slidable by means of a drive mechanism, e.g., a pull-cord drive, to open and close the weighing compartment. Each of the side walls 5, 6 and the top cover panel 12 are releasably attached to a guiding device 17, 120 by means of holders that are integrated in the guiding devices 17, 120. The front wall 7 is likewise releasably attached with a holder element 19.

By tilting them slightly, the side walls 5, 6, the front wall 7, and the top cover panel 12 can easily be removed from their holders for cleaning.

In their opened position, the side walls 5, 6 as well as the top cover panel surround the housing 3. This is possible, because the housing 3 is dimensioned smaller in width and height than the weighing compartment 4.

The guiding devices 17, 120 of the side walls 5, 6 as well as of the top cover panel 12 have coupling elements (not shown in FIG. 1) by which the side walls 5, 6 and the top cover panel 12 are connected to the pull cords of a drive mechanism. Each of the side walls 5, 6 has a separate actuator handle 18 for the coupling element, as does the top cover panel 12 (not shown in FIG. 1; see FIGS. 2 and 4). This makes it possible to open and close the side walls 5, 6 and the top cover panel 12 either individually or in any combination of two, or all at the same time.

The balance 1 is equipped with a carrying handle 13 at the top of the housing 3. In addition to its carrying function, the handle 13 also serves as a guide track for opening and closing the top cover panel 12. A guide element 14 of the guiding device 120 runs along the guide track. The top cover panel 12 is attached to the guide element 14 through the holder 15. As described above, the holder 15 of the top cover panel 12 is configured in such a way that the top cover panel 12 can be taken off, e.g. for cleaning, by a simple tilting movement.

The top edges of the side walls 5, 6 are framed by inward-slanted border pieces 11 that hold the top edges in place through snap-closure elements (not shown in FIG. 1) and rest against the slanted corner sections 23, 24 of the rear wall 9 and the front wall 7, respectively. The angled portions of the border pieces can overlap differently shaped top edges of the side walls 5, 6 and also of the top cover panel 12 in such a manner that they form a kind of baffle seal against the outside air, so as to block air drafts even more effectively from entering the weighing compartment 4 than do common types of draft shields. As a further advantageous feature, the border pieces 11 can be made of a transparent material.

As mentioned above, the rear wall 9 of the weighing compartment is wider as well as taller than the housing 3. This makes it possible to provide cutout openings 20 in the rear wall 9 that can be arranged on the sides as well as on top. The cutout openings 20 can be closed by means of interchangeable clip-on covers 21. For example, the clip-on covers could be removed from one or more of the cutout openings 20 in order to provide passages for supply lines such as electrical cables and/or hoses for liquids that are to be weighed. In this way, experiments can be performed inside the weighing compartment while simultaneously observing weight changes without having to open the weighing compartment and thereby running the risk of causing weighing errors. Of course, cutout openings 20 could conceivably be provided also in the side walls 5 or 6 and/or in the top cover panel 12.

Figure 2:
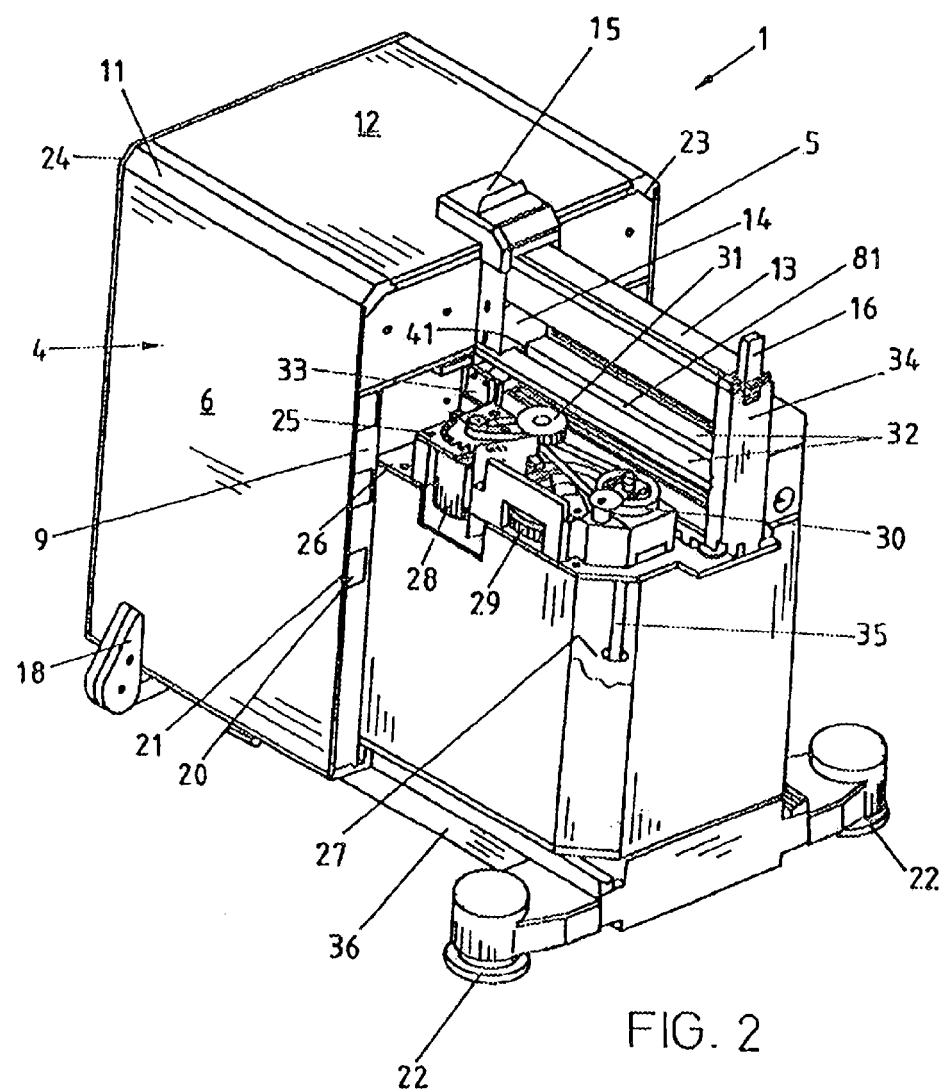
FIG. 2 shows the balance in a perspective view as seen from a direction according to the arrow II of FIG. 1, but with the housing taken off.

FIG. 2 illustrates a balance 1 as seen in the direction of the arrow II of FIG. 1, with the housing 3 partially removed and the weighing compartment 4 closed. The side walls 5, 6 as well as the top cover panel 12 can be moved individually or together, either manually or in a motorized mode, preferably with a single motor 28, so that either or both sides and/or the top of the weighing compartment can be opened and closed as desired in a given situation. FIG. 2 illustrates in particular the drive mechanism for moving the panels 5, 6 and 12, which extends on the three levels 25, 26, 27 and a further level 36. The drive-mechanism shown in this example is a cord-pulley drive. An upper cord-pulley drive on the level 26 (not visible) serves to move the top cover panel, and a lower cord-pulley drive on the level 36 (likewise not visible) serves to move the side walls 5, 6.

FIG. 2 further shows the guiding mechanism for the top cover panel 12. The carrying handle 13 simultaneously serves as a guide rail for the guide element 14 of the holder 15 of the top cover panel 12, which runs along the carrying handle 13. The handle 13 is connected to the level 26 though a connector brace 34. Two holding members 32 for the housing 3 (removed in FIG. 2) are arranged between the connector brace 34 and the rear wall 9. A lower portion 33 of the guide element 14 is arranged below the holding members 32 and joined through a narrow connector 41 to the holder 15 of the top cover panel 12 (The design details are illustrated in FIG. 3).

The cord-coupling lever 16, serves to couple and uncouple the top cover panel 12 with the upper cord-pulley drive 38 (see FIG. 4).

Figure 3:
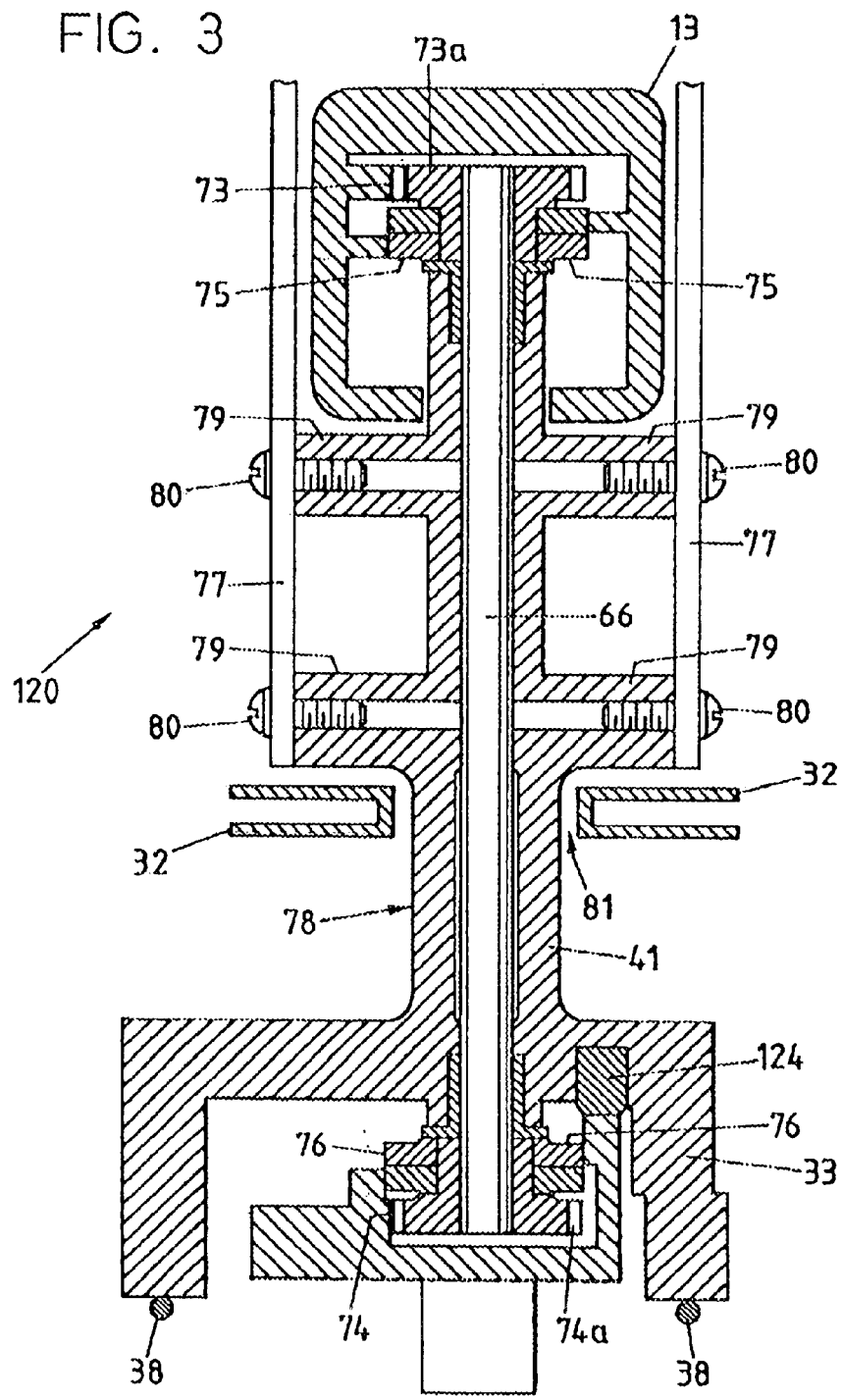
FIG. 3 represents a sectional view of the guiding mechanism and the drive mechanism of the top cover panel.

The sectional view of FIG. 3 illustrates the guiding device 120 of the top cover panel 12 (the latter not being shown in FIG. 3). The body 78 of the guide element 14 has laterally projecting ridges 79, to which the plates 77 are attached by screws 80. The top portions of plates 77 (broken off in FIG. 3) are connected to the holder arrangement 15 (likewise not shown) for the top cover panel 12. The upper portion of the body 78 is surrounded by the carrying handle 13. Inside the carrying handle and to the left of the middle is an upper gear rack 73 which is engaged by an upper gear 73a. A similar arrangement is used with the lower gear rack 74 and the lower gear 74a in the bottom portion 33 of the guide element 14. The gears 73a and 74a are connected by a vertical shaft 66. To prevent any loose play from side to side, there are pairs of guide rollers 75 and 76 arranged next to the upper gear 73a and the lower gear 74a, respectively, so that the guide element 14 will always run straight and in correct alignment along the carrier handle 13. The vertical force on the guide element 14 is taken up by a glide element 124. However, the guide element 14 could also run on one or more rollers. The underside of the bottom portion 33 of the guide element 14 is coupled to the upper cord-pulley drive 38. The body 78 is moved along the gear racks 73 and 74 by means of the cord-pulley drive 38.

The narrow connector portion 41 of the body 78 runs in a slot 81 between the border members 32 of the housing 3 (also see FIG. 2). The slot 81 can be sealed against dust by overlapping lamellae, sealing lips or brushes.

FIG. 4 shows a side view of the drive mechanism for the top cover panel 12, complementing FIGS. 2 and 3. The area of the drive source is arranged on two levels 25 and 26, as in FIG. 2, but without showing the motor 28 in the drawing. A coupling lever 16 is arranged at the rearward end of the carrying handle 13, controlling a clutch 118 (not shown) that couples and uncouples a connection between the gear 82 and the pulley 29, so that the top cover panel can be selectively coupled to or uncoupled from the motor 28. The motor 28 can be a reversible motor, or a reversing gearbox can be provided to allow the cord-pulley drive to run forward and backward. A gearbox could be either manually reversible or actuators could be provided that work like electrical limit switches to reverse direction when the guide element 14 reaches an end position. The drive power is transmitted from the motor 28 by way of a spur belt to the gear 30 which, in turn, drives the gear 82 through the pinion 89.

As may be seen in the drawing, the level 26 is formed by a horizontal plate resting on tall columns 83, and the level 25 is formed by a smaller plate supported on the level 26 by short columns 84. The lower gear rack 74, shown schematically in the drawing, can likewise be supported by the level 26 through columns 85 (only one of which is visible in the drawing). The lower gear rack 75, the upper gear rack 73 (arranged inside the carrier handle 13, as shown in FIG. 3), the connector brace 34, and the rear wall 9 together constitute a rigid frame that hold the slidable top cover panel 12 in precise alignment. The top cover panel 12 is attached to the holder 15 which, in turn, is connected by way of the plates 77 to the body 78 (not visible in the drawing) of the guide element 14 as described above in the context of FIG. 2. The lower portion 33 of the guide element 14 is guided along the lower gear rack 74. A pin-like connector element 86 protrudes from the underside of the guide element 14 and serves to connect the guide element 14 to the upper cord-pulley drive 38. The cord is guided by the pulleys 29, 87 and 80 and is looped around the driving pulley 29 in a known manner. The driving pulley 29 can run, e.g., on a ball bearing 90.

The gear 30 that is driven by the motor 28 by way of a spur belt (see FIG. 2) is connected through the shaft 35 to the pinion gear 89 (shown in FIG. 4). The shaft 35 is configured in such a way that it can be inserted and removed in a simple manner from above for assembly and disassembly. The pinion gear 89 meshes with a gear 82 (which was mentioned previously in the context of FIG. 2) on a shaft 91 whose position can be raised and lowered. By changing the vertical position of the shaft 91 together with the gear 82, the latter is coupled to and uncoupled from the pulley 29. The clutch between the gear 82 and the pulley 29 can be designed in a variety of known configurations, but an arrangement of ramps 92 with a locking spring element is preferred.

The top panel clutch 118 is operated by the clutch lever 16 that was already mentioned in the context of FIG. 2. By means of the lever 16, the operator can selectively disengage the pulley 29 from the motorized drive 28, 82 in order to be able to manually move the top cover panel 12, or to move the side walls 5, 6 alone without moving the top cover panel. The clutch lever 16 is connected to a cam disk 93 that rotates together with the lever 16 on an axle 94 that is held by the connector brace 34. A push rod 95 is guided for vertical movement inside the connector brace 34. The two-armed lever 97 pushes the rod 95 upward against the cam 93.

The other end of the two-armed lever 97 bears against the bottom end of the shaft 91 on which the gear 82 is mounted. A spring 98 that is attached to the level 25 bears against the top end of the shaft 91 and urges the latter downward against one arm of the lever 97. This causes the lever arm on the other side of the fulcrum 96 to push the rod upwards against the cam 93. Thus, when the clutch lever 16 is moved counterclockwise, the cam 93 pushes the rod 95 downward against the force of the spring 98 and tips the two-armed lever 97 in the clockwise direction. This causes the other lever arm to raise the shaft 91 with the gear 82 and thereby disengage the clutch between the gear 82 and the pulley 29. In the disengaged position, the gear 82 stays in mesh with the pinion 89. The manual actuation of the clutch could, of course, be replaced by an automatic actuation, e.g., through an electromagnetic actuating member.

What is claimed is:

1. A balance (1) comprising a weighing compartment (4) that borders on a stationary part (8, 9) of the balance and is otherwise enclosed by at least one side wall panel (5, 6), a front wall panel (7), and a top cover panel (12); wherein at least one of said panels is slidable by means of a guiding device (17, 20) to open and close the weighing compartment (4); and further comprising a handle (13) serving at least one of the purposes of lifting the balance (1) off a support surface and carrying the balance (1), wherein the guiding device (120) of the top cover panel (12) is at least partially integrated in the handle (13).

2. The balance (1) of claim 1, wherein the handle (13) is attached to the stationary part (8, 9) of the balance (1).

3. The balance (1) of claim 1, wherein the handle (13) is arranged on top of the balance (1).

4. The balance (1) of claim 3, wherein the handle (13) is arranged near the top cover panel (12).

5. The balance (1) of claim 1, wherein the handle (13) is designed and is arranged on the balance (1) in such a way, that the balance (1) can be lifted with one hand.

6. The balance (1) of claim 1, wherein the handle (13) is configured as a rail for a guide element (14) of the guiding device (120) of the top cover panel (12).

7. The balance (1) of claim 6, wherein the guide element (14) comprises a vertical body (78) holding a vertical gear shaft (66) with an upper gear (73a) and a lower gear (74a) and the guiding device comprises a pair of gear racks (73, 74) meshing with the gears (73a, 74a).

8. The balance (1) of claim 6, wherein the guide element (14) is laterally guided in the guiding device (120) by a gliding constraint that prevents jamming of the guide element (14).

9. The balance (1) of claim 6, wherein the guide element (14) is laterally guided in the guiding device (120) by a rolling constraint that comprises guide rollers (75, 76) and provides jamming of the guide element (14).

10. The balance (1) of claim 1, further comprising a holder element (15) for the top cover panel (12), wherein the holder element (15) is integrated in the guiding device, and wherein the holder element has a form-locking closure device that holds and releases the top cover panel (12) through application of a manual force to at least one of the top cover panel (12) and the holder element (15).

11. The balance (1) of claim 1, further comprising a clutch lever (16) arranged on the handle (13), whereby the top cover panel (12) can be coupled to and uncoupled from a motorized drive mechanism that serves to move the at least one slidable wall (5, 6, 12).

* * * * *